Figure 4:
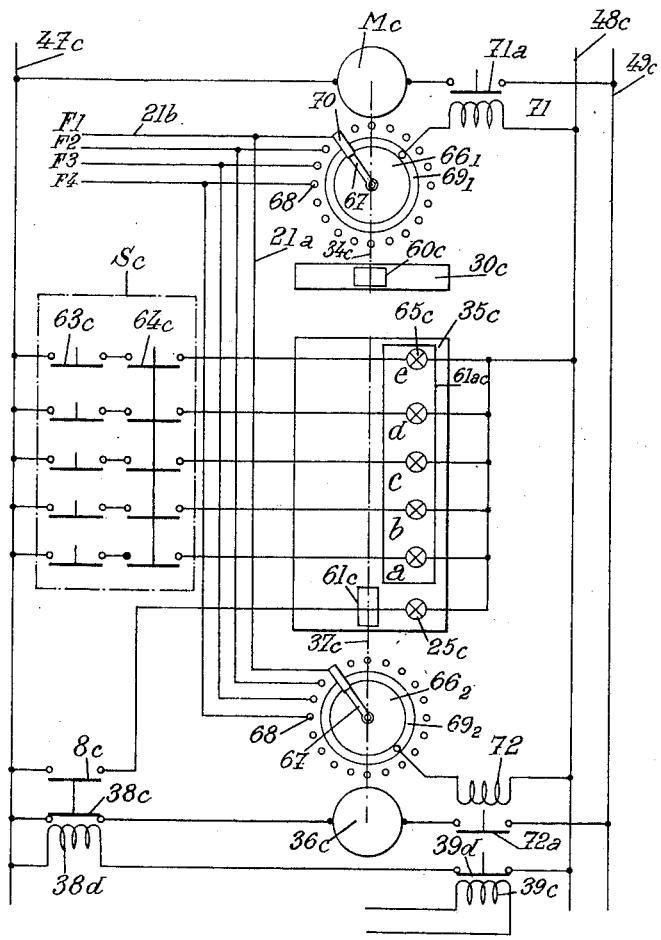

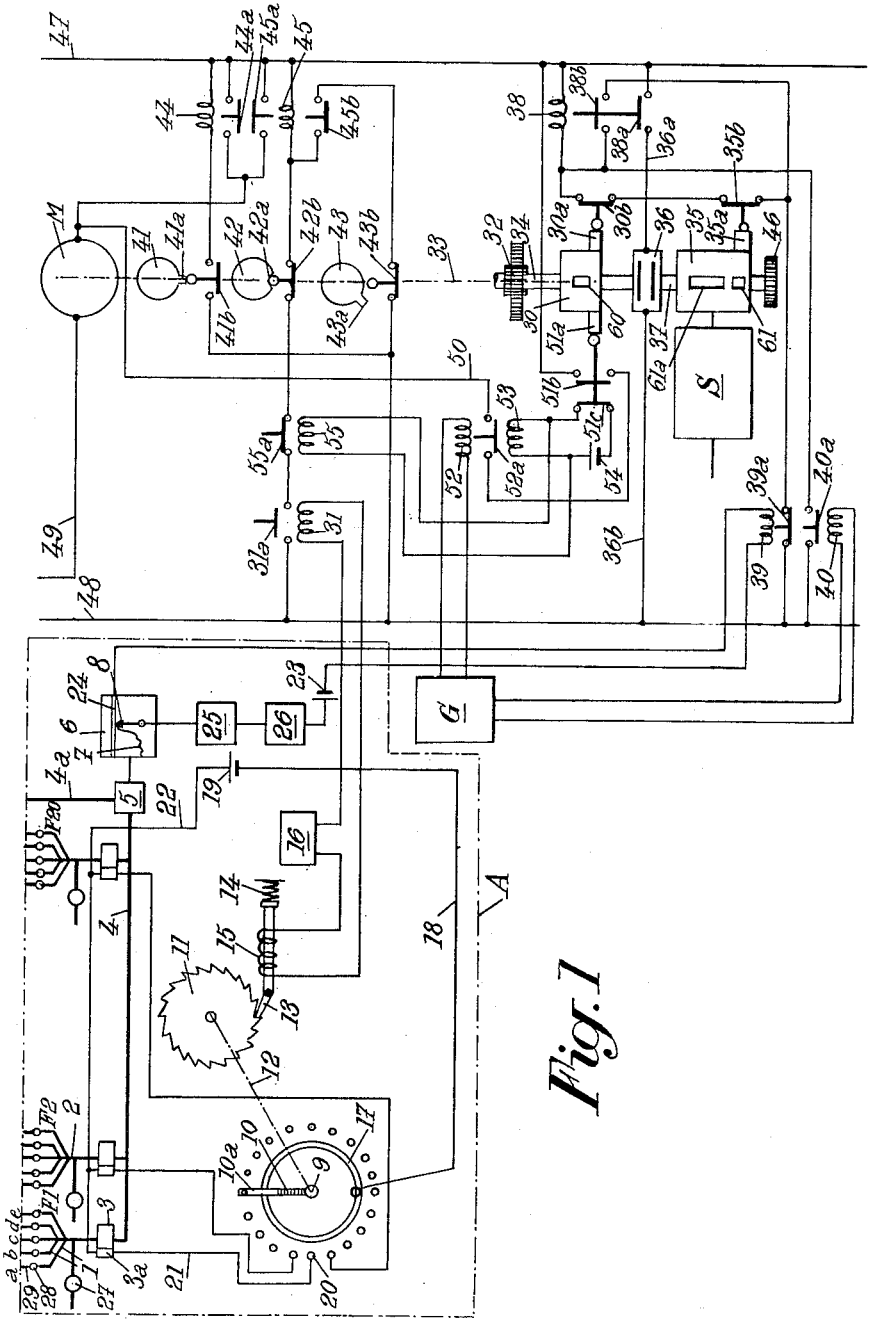

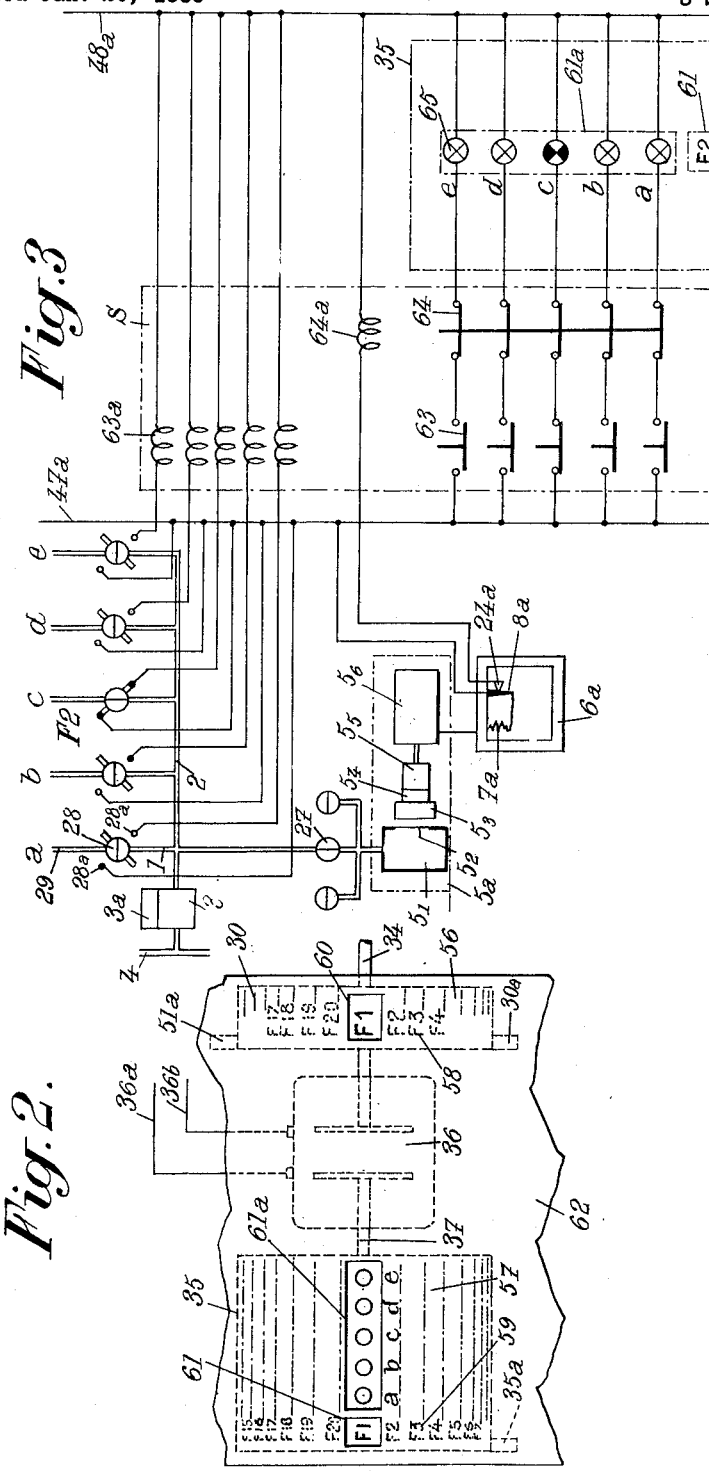

United States Patent Office 3,093,003
Patented June 11, 1963

3,093,003
DISPLAY DEVICE FOR USE IN INSTALLATIONS FOR CYCLICALLY CHECKING, BY MEANS OF A LIMITED NUMBER OF APPARATUS THE VALUES OF A MAGNITUDE AT A MULTIPLICITY OF POINTS
Roland Cochinal, Paris, Jean Goupil, Fontenay-aux-Roses, and Jean Megy, Paris, France, assignors to Commissariat a l'Energie Atomique, Paris, France, a body corporate of France
Filed Jan. 26, 1959, Ser. No. 789,146
Claims priority, application France Jan. 27, 1958
19 Claims. (Cl. 73—432)

The present invention has for its object a display device for use in installations for cyclically checking, by means of a limited number of apparatus, the values of a magnitude at a multiplicity of points, respectively.

It is known that, when it is necessary to check or monitor in a permanent manner the values of a physical magnitude (such as an electrical magnitude, a temperature, a pressure, a nuclear radiation intensity) at a great number of points, it is advantageous, especially for reasons of economy and reduction of the space occupied, to make use of a limited number of measuring and/or recording apparatus (voltmeters, pressure gauges, radioactivity detectors, etc.). Each of these apparatus then deals successively and cyclically with the indications coming from a great number of points through suitable channels (electric lines, fluid transmission conduits, etc.).

Generally, these channels are assembled in a plurality of groups and the respective groups, each of which conveys a mean indication for the channels it contains, are successively and cyclically connected with the measuring and/or recording apparatus serving to the general monitoring of the groups. In this case, it is advantageous to provide at least one other apparatus for taking charge, as soon as an anomaly has been detected in a group by said general monitoring apparatus, of this group in order to determine, by scanning of the respective channels thereof, which particular channel corresponds to the point where the magnitude has exceeded the alarm level, the first apparatus going on its scanning of the other groups. Hereinafter, we will call defective groups or defective channels the groups or channels conveying an indication which is below or above an alarm level.

This double scanning, of the groups for the groups which are not defective, and of the channels for the channels of a defective group, must be displayed on a monitoring board to enable the person in charge of the installation to localize the defects which may occur and to follow their evolution.

The display device according to the invention for use in installations for cyclically checking the values of a magnitude at a multiplicity of points by means of a cyclical switch device ensuring, with suitable lines, the successive and repeated determinations, by means of at least one measurement apparatus, of the value of said magnitude for systems of points including each at least one of said points is characterized in that it comprises a first indicator element which is driven in synchronism with said switch device, a second indicator element normally driven in synchronism with the first indicator element and means for stopping the second indicator element as soon as a determination made by said apparatus exceeds a given limit value.

The display device according to the invention is suitable for use in various types of monitoring installations, for instance in those for checking the correct operation of a petroleum distillation or cracking tower, of a chemical synthesis unit, of an electrical power station, but it is well adapted to the checking of heterogeneous nuclear reactors cooled in gaseous phase, that is to say including a series of parallel channels provided in the mass of a moderator such as graphite. In this particular case, the device is essentially used to check the gastightness of the cans which surround nuclear fuel rods (for instance of uranium) placed in said channels, by detecting the radioactivity of the respective gaseous streams which have been in thermal exchange contact with said cans, the bursting of a can resulting in the introduction of fission products into the gaseous stream flowing along said can, which greatly increases the radioactivity of this gaseous stream. It then suffices to collect from every channel or group of channels of the reactor, through a tube of small cross-section, a gaseous stream and to send such streams successively past a radioactivity counter. Devices for detecting can bursts are described in the French Patent No. 1,127,618, filed June 9, 1955, by the Commissariat a l'Energie Atomique, and in the U.S. patent application Ser. No. 769,226, of October 23, 1958. These can burst detection devices are arranged in such manner as automatically to operate, when the activity they measure for a group of channels corresponding to a group of tubes exceeds a predetermined limit value, an alarm device and also sometimes a detector and follower mechanism which permits of studying the successive tubes of the suspected or defective group so as to localize the channel of the reactor in which a can burst has occurred.

In this case, the device according to the invention permits of displaying, i.e. indicating, on the one hand the group of channels the radioactivity of which is measured at the corresponding time by the radioactivity detector and on the other hand, in case of a can burst, the reactor channel in which is located the injured can.

Preferred embodiments of the present invention will be hereinafter described with reference to the accompanying drawings, given merely by way of example and in which:

FIG. 1 diagrammatically shows a first embodiment of a device made according to the present invention.

FIG. 2 is a view, on an enlarged scale, showing the display means proper of this device.

FIG. 3 diagrammatically shows, in a device of the type of that of FIG. 1, means for checking the successive channels of a defective group and means for indicating the defective channels.

FIG. 4 is a diagrammatical view of a second embodiment of the invention.

The device shown by FIG. 1 includes N groups each of which includes L channels. In the following description, it will be supposed that N is equal to 20 and L to 5, so that the device is capable of monitoring one hundred channels forming twenty groups ($F_1$, $F_2$ ... $F_{20}$) each including five channels (channels $a$, $b$, $c$, $d$, $e$).

Every group 2 has its outlet connected, through a valve member 3, to a common collector pipe 4 leading to a measurement apparatus 5 of a suitable type, followed by a recorder 6 which produces a curve 7 by means of a stylus 8, so as to record the measurement effected by apparatus 5.

A return pipe 4a may be provided in some cases, leading out from apparatus 5.

The valve members 3 are cyclically operated so as to place the respective groups 2 successively into communication with the main pipe 4. This cyclical control of the valve members may be effected through any suitable means including for instance, as shown, a rotary switch 9 having a movable arm 10 rotated step by step, for instance from a ratchet-wheel 11 fixed on the same shaft 12 as arm 10. This ratchet-wheel 11 is driven by a pawl 13 against the action of a return spring 14, under the effect of the periodical excitation of the winding 15 of an electro-magnet by an impulse generator 16 of a known type, which supplies for instance an impulse or a train of electric waves for one second at predetermined time intervals, for instance of one minute.

Arm 10 carries a conductor bar 10a which closes an electric contact between a fixed conductor ring 17 (connected through a conductor 18 with the first terminal of a source of current 19) and contact studs 20 each connected through a conductor 21 with one of the terminals of the device 3a (such as a control electro-magnet) for operating every valve member 3, the other terminal of every device 3a being connected through a conductor 22 to the second terminal of the current source 19.

Generally, it is of interest to provide means enabling the recorder 6 (or the measurement apparatus 5) to close an electric alarm circuit fed with current from a source 23 when the value recorded by stylus 8 exceeds a given level, adjustable for instance by means of a conductor rod 24.

For this purpose, rod 24 and stylus 8 are connected each with one of the terminals of source 23, for instance through a warning device 25 (of the sound and/or luminous type) and/or through a unit 26 ensuring, when it is excited, the successive monitoring of the respective channels of the defective group for which the value recorded by stylus 8 has exceeded the given level.

This particular monitoring operation starts with the closing of the valve member 3 corresponding to this group (so that it is no longer subjected to the general monitoring which has been described up to now with reference to the elements contained in frame A of FIG. 1) and the opening of the valve member 27 of the same group (which connects this group with the follower device shown on FIG. 3 where the same reference numerals as those of FIG. 1 have been used to designate the same channels, groups and valve members). Then element 26 controls the cyclical opening of the L valve members 28 of this group to achieve a cyclical monitoring as it will be hereinafter explained with reference to FIG. 3.

The monitoring system which has been described and the display device according to the invention which will be hereinafter described are suitable for checking variations, at a multiplicity of points, of physical magnitudes of various kinds (pressures, temperatures, speeds, electrical intensities or voltages, radioactivities, etc.). For instance, channels 1, groups 2 and elements 4 and 4a may be tubes through which fluids are conveyed, elements 3—3a being then electro-valves and apparatus 5 a pressure gauge (which makes it possible as well to measure pressures as flow rates by means of known pneumatic or hydraulic measurement apparatus disposed at suitable points) or channels 1 and groups 2 may be conductors for conveying electric currents which may depend for instance upon temperatures measured through thermocouples, upon gaseous flow rates measured by heated wires placed in gaseous streams, upon illuminations measured by means of photo-electric cells, or upon any physical magnitudes the values of which may be translated into electrical magnitudes through known apparatus, and in this case members 3—3a are relays which, when they are successively energized, pass from the position of rest to the position of work in which they connect the groups or conductors 2 cyclically with the common conductor 4, the electric current being measured by apparatus 5. The device may also serve to check the percentage of dust, radioactive elements or any product whatever, in a fluid at a great number of different points.

As above indicated, one of the chief applications of the monitoring installation with its display device (the latter to be hereinafter described) is that concerning the monitoring of nuclear reactors, in particular of heterogeneous reactors cooled by a gaseous medium, to detect bursts of the cans which contain the uranium slugs placed in the channels of the reactors (the channels being for instance provided in a graphite block which constitutes the moderator of the reactor). In this case, we collect from every reactor channel, by means of a tube 29 of small cross-section, a portion of the stream flowing through the channel, elements 3—3a being an electro-valve, elements 1, 2, 4 and 4a tubes or pipes and apparatus 5 a radioactivity detector including for instance, as shown on FIG. 3 for unit 5a, a detection chamber $5_1$ provided with a window $5_2$ opposite which is disposed a scintillating substance $5_3$ associated, in the known manner, with a photo-multiplier $5_4$ the output of which is connected in series with a preamplifier $5_5$ and an amplifier $5_6$ which acts, through a ratemeter, on stylus 8a. Such devices for monitoring the fuel cans of a reactor are described in the literature relative to nuclear reactors and for instance in the patent and patent application above referred to.

Whatever be the type of magnitude measured by the system disposed in frame A, we always obtain, on the one hand a cyclical indication of the successive values of this magnitude corresponding to the respective groups and on the other hand an alarm signal when an alarm level is exceeded by the indication conveyed by one of the groups. It is therefore necessary to display or indicate, on the one hand, which group is being examined at a given time, that is to say which group is connected with the apparatus 5 through a valve member 3 and, on the other hand, if the alarm level is exceeded for one group, the indication of this defective group.

FIGS. 1 and 2 show a first embodiment of such a display device and include, as shown on the right hand side portion of FIG. 1, the following parts:

(1) A first indicator element, such as a drum 30, which is rotated in synchronism with the arm 10 of rotary switch 9, that is to say with the cyclical analysis of group 2, for instance by means of a synchronous motor M which performs one complete revolution in some seconds, as it will be hereinafter explained, on every closing of the contact 31a of a relay, the winding 31 of which is energized at the same time as the winding 15 by the generator 16 which constitutes the clockwork of the whole installation. The frequency of the impulses (or wave trains) transmitted by generator 16, which may last for instance about one second, depends upon the rate of analysis of the groups. For instance, if the twenty groups 2 are scanned in twenty minutes, generator 16 transmits an impulse or wave train on every minute through windings 15 and 31. In this case, a speed reducing gear 32 divides by N (that is to say 20 in the case which is considered) the angular velocity of the shaft 33 of motor M before transmitting it to the shaft 34 of drum 30 which therefore runs in synchronism with arm 10 (drum 30 makes one twentieth of a revolution while motor M makes one revolution, that is to say while arm 10 turns through one twentieth of a revolution). This is why, in a modification, arm 10 instead of being driven by a ratchet-wheel 11 may be fixed on shaft 34, and elements 11, 12, 14 and 15 may be dispensed with;

(2) A second indicator element, such as a drum 35, which runs normally in synchronism with drum 30 with which it is for instance coupled by means of a clutch 36 inserted between shafts 34 and 37, the latter carrying drum 35;

(3) Means for stopping drum 35 as soon as the alarm value has been exceeded in a group 2, which means may include, in addition to clutch 36, elements for acting thereon in response to the passage of current through the alarm circuit fed from source 23. For this purpose, clutch 36 is advantageously a magnetic clutch supplied through conductors 36a and 36b, the opening of contact 38a by deenergizing of the winding of the corresponding relay 38 placing it out of engagement. It therefore suffices to provide in the feed circuit of winding 38 a contact 39 which is normally closed but which is opened when current flows through its winding 39 disposed in said alarm circuit.

The display device further comprises:

(4) Starting means comprising a starting relay (with its winding 40, excited from a starting generator G which sends for this purpose an impulse which may also last for about one second, and its contact 40a which permits of starting the excitation of the winding 38) and a self-supply contact 38b of winding 38, respectively to bring and to keep the clutch 36 in the engagement position;

(5) Means for causing motor M to make one revolution, and only one, on every impulse supplied by clockwork 16, these means comprising for instance three cams 41, 42 and 43 including respectively a projection 41a, a notch 42a and a projection 43a which cooperate, respectively, with the push-piece for controlling a contactor 41b, 42b and 43b, respectively. Contactor 41b acts upon the feed circuit of a relay winding 44 the contact 44a of which is disposed in a first feed line of motor M, whereas contactor 42b acts upon the feed circuit of a relay winding 45 the contact 45b of which is disposed in its self-maintaining feed line and the contact 45a of which is disposed in the second feed line of motor M. Finally, contactor 43b is disposed on the self-maintaining feed line of the relay winding 45;

(6) Means to permit of resetting drums 30 and 35 in synchronism after the measurement which, for a defective group, had exceeded the limit value, has ceased to be beyond said value.

These means may include:

A milled knob or pinion 46 for manually or mechanically rotating drum 35 in order to bring it into the position where it displays or indicates a reference group hereinafter designated by the term "group F1;"

A lug or projection 35a carried by this drum and acting upon a contactor 35b and a lug 30a carried by drum 30 and cooperating with a contactor 30b, these two lugs or projections 35a and 30a being disposed in such manner that the corresponding contactors 35b, 30b are closed only when the drums 35, 30 indicate the group F1.

(7) Possibly, means to permit a restarting and this from the first group, after an accidental stopping of the feed of current. It may in fact happen that this current—which is supplied for instance through lines 47 and 48 for the relays and 47 and 49 for motor M (lines 48 and 49 may possibly be merged into one and line 47 might be the metallic mass of the system)—is cut off due to some failure. In order to reset drums 30 and 35, which may have stopped when indicating any group of channels, on group F1 from which the device can again start operating correctly (because the step by step rotation of switch 9 may have continued to take place during the failure of current if it is not fixed on shaft 34, and/or means are provided for returning arm 10 upon the contact stud 20 of the group F1 after a breakdown of current), there has been provided, in the embodiment that is illustrated by the drawings, a circuit for resetting in position, which essentially comprises:

An auxiliary line 50 for directly feeding current to motor M, this line being cut off at the level of contact 51b by the projection 51a of drum 30 when said drum is in the position indicating group F1 and at the level of contactor 52a which is normally open;

A first relay winding 52 closing this contactor 52a and fed, like winding 40, from generator G;

A second winding 53 opening contactor 52a when it is excited (for instance from a source 54) by the closing of contactor 51c when drum 30 reaches the position for which it indicates the group F1;

A relay winding 55, fed in the same conditions from source 54 and acting upon a contact 55a so as to close it with a slight delay (for instance averaging two seconds) after drum 30 has given the indication of group F1, this winding 55 being arranged to remain fed with current through means which are not shown.

The display or indication of the groups may be made in any known manner in accordance with the position of drums 30 and 35. We may for instance, as shown by FIG. 2, constitute each drum 30, 35 by a prism having N side faces 56, 57 respectively, (twenty faces in the present case), the respective faces of each prism carrying, written thereon, the references 58, 59 of the groups in the order of their analysis, the reference numeral being possibly accompanied by a letter when the complete monitoring installation includes several series of N groups, each series including a display device according to the invention; in this case, every display device is for instance marked by a differnet letter (the description and drawings are concerned with a single series of twenty groups bearing the indication of letter F); these inscriptions 58, 59 cooperate with widows 60, 61 or orifices provided in a mask 62 disposed in front of the drums. Thus, window 60 permits of seeing at any time the indication of the group that is being analyzed (for instance F1 as shown) and the window 61, either the indication of the group that is being analyzed if the operation of the channel that is being scanned is correct, or the indication of the defective group in which the defective channel is being detected by means of the device of FIG. 3, this defective channel being displayed in the supplementary window 61a.

The operation of the device of FIGS. 1 and 2 is as follows:

Initially, the respective contacts may be for instance in the position shown by the drawings. Generator G sends an impulse of a duration of about one second through the relay winding 40, which closes contact 40a. Winding 38 is excited which closes, on the one hand the self-maintained contact 38b (through the closed contact 39a), and on the other hand contact 38a which operates the clutch 36 and places it in engagement position. Drums 30 and 35 therefore rotate together. This starting is to take place even if the drums are not displaying the group F1, that is to say even if contacts 30b and 35b are opened, since the energizing of 38 takes place through contact 40a. From this time on, every impulse sent by clockwork mechanism 16 through the relay windings 15 and 31 produces, on the one hand the forward movement of arm 10 to the next contact stud, and on the other hand the closing of switch 31a. This closing has for its effect to energize the relay winding 45 which remains in circuit while closing its contact 45b. Winding 45 also closes contact 45a which supplies current to motor M which starts running. This operation of motor M has for its effect to rotate cams 41, 42 and 43 fixed on cam shaft 33. At the beginning of the rotation, cam 42 opens contact 42b, which cuts off the direct feed to the relay winding 45, but this relay remains excited due to the fact that it is automatically maintained so by the closed contact 43b until projection 43a opens contact 43b. But this opening, which would result in stopping motor M, takes place only after the closing of contact 41b by the rotation of cam 41, and consequently after motor M is fed through contact 44a which has been closed by the energizing of its winding 44. Motor M therefore rotates until it has moved one revolution. At this time, projection 41a opens contact 41b, which cuts off the feed of current to the motor due to the opening of contact 44a the winding 44 of which ceases to be excited. During this time, due to the speed reducing gear 32, drums 30 and 35 have rotated through one twentieth of a revolution. It will therefore be seen that arm 10 and drums 30 and 35 rotate in perfect synchronism and therefore display the indications of the group that is being analyzed by apparatus 5.

Such a rotation in synchronism step by step goes on until the stylus 8 reaches contact 24 due to the fact that the limit value has been exceeded by the indications conveyed from one of the groups of channels. Then source 23 supplies current to relay winding 39, which opens contact 39a and consequently stops the feed of current to relay winding 38. This results in the opening of contact 38a and consequently the disengagement of the clutch 36. Drum 35 ceases running whereas drum 30 keeps running step by step. From this time on, drum 30 indicates the group of channels that is being scanned, whereas drum 35 permanently indicates the group of channels that has been detected as defective.

When the level of radioactivity in the defective group returns to a normal value, the circuit of source 23 is cut off between 8 and 24 and consequently the winding of relay 39 is no longer energized, which permits the closing of contact 39a. The resetting of the rotation of drum 35 into synchronism with that of drum 30 takes place as follows. By means of milled knob 46, drum 35 is manually or mechanically reset in the position where it indicates channel F1, which has for its effect to close contact 35b. Motor M keeps running step by step and guides drum 30 until it also indicates channel F1, which causes the closing of contact 30b. Contacts 35b and 30b being closed, winding 38 is energized through the closed contacts 39a, 35b and 30b. It then closes the self-maintaining contacts 38b and contact 38a which causes clutch 36 to be brought into engagement. Thus, the normal conditions of operation are restored, both of the drums 30 and 35 rotate step by step in synchronism with arm 10 and indicate at any time the group of channels that is being analyzed by apparatus 5.

It is also necessary to provide for the possibility of a breakdown in the feed of current to the device, and in this case the restarting after resetting upon the group F1 takes place as follows. When the current feed is restored, generator G closes contact 52a while exciting its winding 52. If drum 30 is not in the position for which it displays the indication of group F1, contact 51b is closed and consequently motor M is fed through contacts 52a and 51b which are closed. Motor M will now rotate in a continuous fashion, without cams 41, 42 and 43 having to act, until drum 30 occupies the position in which it displays the indication of group F1, which opens contact 51b and stops the continuous rotation of motor M. At the same time, contact 51c is closed, which energizes the winding 53 and therefore opens the contact 52a. Consequently, when drum 30 moves one step forward, the closing of contact 51b will no longer have for its effect to feed current directly to motor M, due to the fact that contact 52a is kept in the open position.

It will be noted that the winding of relay 55 has for its effect to close contact 55a only after resetting in position of drum 30 on the group F1 and with some delay (averaging two seconds) so as to permit the feed of current to motor M (in order to ensure its rotation step by step) through the contacts controlled by cam shaft 33, this relay winding 55 having its feed maintained automatically through means which are not shown.

Concerning the detection, in a defective group (for instance group F2, which has given a response exceeding the limit value and consequently which has stopped drum 35), of the defective channel, the unit 26 acts upon the arrangement shown by FIG. 3.

This figure again shows channels 29 and 1 and valve members 3 and 27 of the group F2 of FIG. 1. The cyclical analysis of the five channels 1 of group F2 (designated by reference characters $a$, $b$, $c$, $d$, $e$) takes place by means of five valves 28 successively and cyclically opened by means of a cyclical switch (not shown) analogous to the cyclical switch 9 but having only L contact studs (five contact studs in the particular case illustrated by the drawings). Valves 28 cooperate with contacts 28a in such manner as to close an electric circuit when the valve is in open position (on FIG. 3, it is valve 28 corresponding to channel $c$ that is open). In each of these circuits, there is disposed a relay winding 63a cooperating with a contact 63. The outlet of every channel 1 of group F2 opens (valve 3 being closed while valve 27 is open, whereas it was the contrary during the scanning of the whole of group F2 when the limit value for radioactivity was not exceeded) into a measurement system 5a analogous to apparatus 5, that is to say including, for the detection of can bursts in a nuclear reactor, as above described, a detection chamber $5_1$ with a window $5_2$, a scintillator $5_3$, a photo-multiplier $5_4$, a preamplifier $5_5$ and an amplifier $5_6$. The integrated output from amplifier $5_6$ is inscribed in the form of a curve 7a in the recording apparatus 6a by means of a stylus 8a. When this stylus 8a reaches an adjustable contact 24a, which represents the alarm limit value chosen for one channel (this limit value being generally different from the limit value determined by the conductor rod 24 for a group of channels), the relay winding 64a is energized, which closes the whole of the five contacts 64 which are disposed each in parallel with a contact 63 and a lamp 65 (visible through a window 61a) between two feed lines 47a and 48a (which may coincide, respectively, with the lines 47 and 48 of FIG. 1).

The operation of the system of FIG. 3 is as follows.

The cyclical opening of valves 28 takes place by means of said five position rotary switch, which produces the successive and cyclical closing of contacts 63. When the limit value is exceeded for one channel, for instance channel $c$, the coming of stylus 8a against contact 24a energizes winding 64a and consequently closes all the contacts 64. Lamp 65, which is in series with contact 63 closed at this time (that of channel $c$) and corresponding consequently to the valve 28 that is open, is switched on, thus indicating for which channel the limit value of radioactivity has been exceeded. On the drawing, we have shown the elements in the position they occupy when the limit value is exceeded for channel $c$ (it is lamp $c$ which is switched on and visible through window 61a).

When the defect has ceased to exist and the value of radioactivity has again become normal, the opening of the contact between points 8 and 24 produces, through the unit 26 (which is no longer under voltage), the closing of the valve 27 of group F2 and the opening of the valve 3 of the same group, which once more connects it with the analysis device of FIG. 1. During the special analysis of group F2, the other groups have continued to be analyzed by the device of FIG. 1.

When the cyclical analysis of the indications conveyed from the various groups is obtained by means of a distributor element, such as the rotary switch 9, controlled by a clockwork device, it is possible to utilize the orders of this part, transmitted for instance through electrical conductors, to control the rotation of the display elements in synchronism with the cyclical analysis.

Such an arrangement is shown on FIG. 4 where we have used, to designate elements corresponding or equivalent to the elements of the first embodiment, the same reference numerals as in FIGS. 1 to 3 but with the index "c." In this embodiment, the display device essentially includes:

(1) Two display elements constituted by a first drum 30c (for instance analogous to drum 30) which displays in its window 60c the indication of the group that is being scanned, and by a second drum 35c (for instance analogous to drum 35) which displays in its window 61c either the group that is being scanned, or the defective group, and furthermore, by means of lamps 65c, the channel of such a group that is defective;

(2) Two synchronous motors, to wit a motor Mc driving drum 30c keyed on its shaft 34c and a motor 36c driving drum 35c fixed on its shaft 37c;

(3) Two identical switches $66_1$ and $66_2$, of the telephonic switch type, having arms 67 fixed respectively on shafts 34c and 37c. Each of them includes N contact studs 68 (twenty on every switch in the particular case that is being considered) corresponding to the N groups, and a fixed conductor ring $69_1$, $69_2$ cooperating with a conductor portion 70 of arm 67. The two contact studs 68 corresponding to the same group of channels are connected together by a conductor 21a and to the conductor 21 of the contact stud 20 (FIG. 1) corresponding to the same group of channels through a conductor 21b; the conductor ring $69_1$ supplies current to a relay winding 71 cooperating with a contact 71a disposed in the feed line of motor Mc from lines 47c and 49c, whereas the conductor ring $69_2$ supplies current to a relay winding 72 acting upon a contact 72a disposed in the feed line of motor 36c;

(4) Means for stopping drum 35c when the radioactivity exceeds a given level, this producing, as above explained, a signal in the circuit of the current source 23 (FIG. 1) which is applied to the winding 39c (connected like the winding 39 of FIG. 1); these means include:

A relay comprising winding 39c and its contact 39d;
A relay winding 38d disposed in series with contact 39d between conductors 47c and 48c and acting upon a contact 38c;
A contact 8c disposed in series with an alarm lamp 25c and actuated by winding 38c;

(5) Finally, luminous signalling means (rectangle Sc) for indicating the channel that is defective in the group upon which drum 35c has stopped; these means may be analogous to those illustrated (in the rectangle S) on FIG. 3: for every channel, a lamp 65c in series with a contact 63c and a contact 64c, corresponding respectively to lamp 65, contact 63 and contact 64.

The operation of the embodiment of FIG. 4 is as follows. Lines 21b being successively fed with current by the conductor portion 10a of the arm 10 of rotary switch 9, the arms 67 of switches $66_1$ and $66_2$ rotate in synchronism with arm 10. This is due to the fact that if it is supposed that line 21b corresponding to group F1 is fed with current, two cases may occur:

(a) The arms 67 are both upon their contact stud 68 connected with said line 21b. Then relays 71 and 72 are energized and contacts 71a, 72a are opened, which cuts off the feed circuit of motors Mc and 36c which therefore do not work. The arms 67 and the drums 30c and 35c remain in the position that is shown and which corresponds to group F1;

(b) One of the arms (or both of the arms), for instance the arm 67 of switch $66_1$, is located upon a contact stud 68 connected with a line 21b other than the line corresponding to the group F1 that is being scanned. Accordingly, the relay winding 71 is not energized and contact 71a is closed, which causes motor Mc to rotate until arm 67 comes onto the contact stud 68 corresponding to group F1; if it is the arm 67 of switch $66_2$ which does not occupy the correct position, relay 72 is not energized and motor 36c rotates to bring arm 67 into the position corresponding to group F1.

It will therefore be seen that arms 67 follow arm 10 step by step and consequently drums 30c and 35c rotate in synchronism with this arm as in the embodiment of FIGS. 1 and 2.

When there is an anomaly indicated by the recording apparatus 6 (FIG. 1), this causes stylus 8 to come into contact with conductor rod 24, thus closing an electric circuit which sends an impulse into winding 39c (as such an impulse is sent into the winding 39 in the case of the device of FIG. 1). Energizing of winding 39c opens contact 39d and therefore deenergizes winding 38d, which causes the opening of contact 38c and closing of contact 8c. The closing of contact 38c has for its effect to stop motor 36c, and consequently drum 35c remains in the position it occupies, that is to say displays the indication of the defective group of channels, even if contact 72a closes subsequently. As to the closing of contact 8c, it has for its effect to switch on the lamp 25c which indicates a defect, this lamp 25c being possibly substituted for the unit 25 provided in the construction of FIG. 1. Of course, instead of, or in addition to, a lamp 25c, we may provide a sound alarm device.

Concerning the determination and the display by lamps 65c of the defective chanel in the group that has been found defective, they are obtained in the same manner as above described with reference to FIG. 3. For the channel that is defective, its contact 63c is closed at the same time as all the contatcs 64c, which causes the corresponding lamp 65c to be switched on in the window 61ac.

When the group that has been indicated as defective ceases to be so, winding 39c is deenergized, which permits a normal drive of the drum 35c by means of switch $66_2$ and motor 36c as above explained.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. For use in a monitoring installation for cyclically checking the respective values of the magnitude of a physical factor in a multiplicity of fluid streams grouped in a plurality of groups, each group comprising at least one fluid stream, this installation including at least one measurement apparatus adapted to measure said physical factor, a plurality of conveying means each adapted to convey at least a portion of each of the fluid streams in one of said groups to said measurement apparatus, and cyclical switch means for operatively connecting said conveying means successively and repeatedly, at regular time intervals, to said measurement apparatus; a display device for indicating both the conveying means effectively operatively connected to said measurement apparatus and the conveying means which was operatively connected to said apparatus when the value of said magnitude has passed a predetermined limit for a particular group, said display device comprising, in combination, a first indicator element capable of displaying a plurality of different indications successively and repeatedly, each of said indications identifying one of said groups respectively, driving means operatively connected with said switch means for shifting said first indicator element from one position indicative of one of said groups to the next position indicative of the next group in synchronism with the operation of said cyclical switch means, a second indicator element also capable of displaying a plurality of different indications successively and repeatedly, driving means operatively connected with said first indicator element for shifting said second mentioned indicator element from one position indicative of one group to the next position indicative of the next group in synchronism with the displacements of said first mentioned indicator element, and means under control of said measurement apparatus for stopping said second mentioned indicator element in response to the measurement by said apparatus of a value of said magnitude passing said predetermined limit for said particular group.

2. A display device according to claim 1 in which said indicator elements are rotating elements, each capable of occupying a plurality of different positions about its axis.

3. A display device according to claim 1 in which each of said indicator elements includes a drum having a plurality of faces distributed about its axis, and a shaft rigid with said drum and extending along said axis, each of said faces bearing the indication of one of said groups, respectively, and means surrounding each of said drums and provided with a window through which only one of said faces thereof can be seen.

4. A display device according to claim 1 in which each of said indicator elements includes a drum having a plurality of faces distributed about its axis, and a shaft rigid with said drum and extending along said axis, each of said faces bearing the indication of one of said groups, respectively, and means surrounding each of said drums and provided with a window through which only one of said faces thereof can be seen, said means for shifting said second mentioned indicator element from one position to the next one including a clutch inserted between said respective shafts, said clutch being normally in engagement, the means for stopping said second mentioned indicator element being means for producing disengagement of said clutch.

5. A display device according to claim 1 in which each of said indicator elements includes a drum having a plurality of faces distributed about its axis, and a shaft rigid with said drum and extending along said axis, each of said faces bearing the indication of one of said groups, respectively, and means surrounding each of said drums and provided with a window through which only one of said faces thereof can be seen, said means for shifting said second mentioned indicator element from one position to the next one including a magnetic clutch inserted between said respective shafts, said magnetic clutch including a normally closed contact and being in engagement when said contact is closed, the means for stopping said second mentioned indicator element being means for opening said contact.

6. A display device according to claim 1 in which each of said indicator elements includes a drum having a plurality of faces distributed about its axis, and a shaft rigid with said drum and extending along said axis, each of said faces bearing the indication of one of said groups, respectively, and means surrounding each of said drums and provided with a window through which only one of said faces thereof can be seen, the means for shifting said first mentioned indicator element from one position to the next one including a motor operatively connected with said switch means to make one revolution for every displacement of said switch means and transmission gear means inserted between said motor and said first mentioned indicator element for rotating the latter through a fraction of a revolution equal to the reciprocal of the number of said drum faces for every revolution of said motor.

7. A display device according to claim 6, further including a clockwork mechanism for controlling, at said regular time intervals, the operation of said cyclical switch means and the starting of said motor.

8. A display device according to claim 1 in which each of said indicator elements includes a drum having a plurality of faces distributed about its axis, and a shaft rigid with said drum and extending along said axis, each of said faces bearing the indication of one of said groups, respectively, and means surrounding each of said drums and provided with a window through which only one of said faces thereof can be seen, said means for shifting said second mentioned indicator element from one position to the next one including a clutch inserted between said respective shafts, said clutch being normally in engagement, the means for stopping said second mentioned indicator element being means for producing disengagement of said clutch, said cyclical switch means including a rotating member adapted to occupy a plurality of different positions each making an angle equal to 360° divided by the number of said groups with the next one, said rotating member being coupled with the shaft of the first indicator element, the means for shifting said first mentioned indicator element from one position to the next one including a motor making one revolution during each of said regular intervals and transmission gear means interposed between said motor and said last mentioned shaft for rotating said shaft through said angle for every revolution of said motor.

9. A display device according to claim 1, for a monitoring installation in which each group includes a plurality of fluid streams and in which, further to said measurement apparatus to which said conveying means are successively and repeatedly operatively connected, is provided at least one auxiliary apparatus similar to said measurement apparatus, said display device further comprising means, which in response to a measurement made by said measurement apparatus of a value passing said predetermined limit for a particular group, on the one hand disconnects from the successive and repeated connection the group for which said measurement passing said predetermined limit has occurred, and on the other hand connects said group to said auxiliary apparatus for determining for which fluid stream of said group said physical factor has caused said passing of said predetermined limit.

10. A display device according to claim 1, further including restarting means for bringing out of action the means for stopping said second mentioned indicator element after, on the one hand said measurement for said particular group has ceased to exceed said limit, and on the other hand each of said indicator elements displays a given reference indication.

11. A display device according to claim 10 in which said restarting means include means for placing said second mentioned indicator element into the position where it displays said reference indication, three contacts connected in series and arranged to be respectively closed only when said predetermined limit is no longer exceeded, when the first mentioned indicator element is in the position where it displays said reference indication and when the second mentioned indicator element is in the position where it displays said reference indication, and a relay capable of maintaining itself in closed position once it has been closed for operating said means for switching said second mentioned indicator element from one position to the next one in synchronism with the displacements of the first indicator element, said relay being mounted to be closed by the simultaneous closing of said three contacts.

12. A display device according to claim 1 in which each of said indicator elements includes a drum having a plurality of faces distributed about its axis, and a shaft rigid with said drum and extending along said axis, each of said faces bearing the indication of one of said groups, respectively, and means surrounding each of said drums and provided with a window through which only one of said faces thereof can be seen, the means for shifting said first mentioned indicator element from one position to the next one including a motor making one revolution for every displacement of said cyclical switch means and transmission gear means inserted between said motor and said first mentioned indicator element for rotating the latter through a fraction of a revolution equal to the reciprocal of the number of said drum faces for every revolution of said motor, and means for running said motor continuously, when current is again normally fed thereto after failure of the feed of current, until said first indicator element is in a position corresponding to a given reference indication.

13. A display device according to claim 12 in which said last mentioned means include a circuit connected with said motor for continuous rotation thereof, two contacts inserted in series in said circuit, one of said contacts being closed only when said first indicator element is in said position corresponding to said reference indication, the second contact being closed on the restoring of normal current feed to said motor until said first indicator element is in said position.

14. A display device according to claim 1 in which said indicator elements are rotating elements each capable of occupying a plurality of different positions about its axis, the means for shifting each of said elements from one position to the next one being a motor having its shaft fixed to the corresponding indicator element respectively, the means for stopping the second indicator element being means for cutting off the feed of current to the motor coupled with said second indicator element.

15. A display device according to claim 14, comprising a plurality of electric lines arranged to be successively and repeatedly supplied with current by said switch means, said lines corresponding respectively to one of said conveying means, a rotary telephonic switch arm fixed on each of said shafts and adapted to occupy N different positions each making an angle equal to 360° divided by the number of said groups with the next one, each of said switch arms being adapted to cooperate, in each of said positions, with one of said lines, and means for feeding current to each of said motors as long as said rotary switch arm corresponding thereto is not in the position where it cooperates with the electric line that is supplied with current.

16. A display device according to claim 1 in which said means for stopping said second indicator element include a recording apparatus operatively connected with said measurement apparatus and including two parts movable with respect to each other, and a relay responsive to a given displacement of said parts with respect to each other for making inoperative said means for shifting said second mentioned indicator element from one position to the next one.

17. Device for displaying on the one hand the actual position of a cyclical switching element having a plurality of different positions for directing successively and cyclically different fluid streams towards a single measuring apparatus adapted to measure a physical magnitude of said fluid streams, and on the other hand, the past position of said cyclical switching element for which the physical magnitude measured by said apparatus passed a predetermined limit value, this device comprising a first display element capable of displaying a number of different indications equal to the number of different positions of said switching element, means operatively connected to said switching element for permanently driving said first display element from one position corresponding to an indication to another position corresponding to the next indication, in synchronism with the operation of said switching element, a second display element also capable of displaying a number of different indications equal to the number of different positions of said switching element, means operatively connected to said switching element for permanently driving said second display element from one position corresponding to an indication to another position corresponding to the next indication, in synchronism with the operation of said switching element, and means, responsive to a physical magnitude measured by said apparatus passing said predetermined limit value, for interrupting the normal driving of said second display element.

18. For use in a monitoring installation for cyclically checking the respective values of the magnitude of the physical factor in a multiplicity of fluid streams, this installation including at least one measurement apparatus for measuring the magnitude of said physical factor, a plurality of conveying means each adapted to convey at least one portion of one of said fluid streams and cyclical switching means for connecting said conveying means successively and repeatedly at regular time intervals to said measurement apparatus, a display device for indicating both the conveying means effectively connected to said measurement apparatus and the conveying means which was connected to said apparatus when the value of said magnitude has passed a predetermined limit for a particular fluid stream, said display device comprising, in combination, a first indicator element capable of displaying a plurality of different indications successively and repeatedly, each of said indications identifying one of said conveying means and therefore one of said fluid streams respectively, driving means operatively connected with said switching means for shifting said first indicator element from one position indicative of one of said conveying means to the next position indicative of the next conveying means in synchronism with the operation of said cyclical switch means, a second indicator element also capable of displaying a plurality of different indications successively and repeatedly, driving means operatively connected with said first indictor element for shifting said second indicator element from one position indicative of one of said comveying means to the next position indicative of the next conveying means in sychronism with the displacement of said first mentioned indicator element, and means under control of said measurement apparatus for stopping said second mentioned indicator element in response to the measurement by said apparatus of a value of said magnitude passing said predetermined limit for said particular fluid stream.

19. A display device according to claim 18 in which each of said indicator elements includes a drum having a plurality of faces distributed about its axis, and a shaft rigid with said drum and extending along said axis, each of said faces bearing the indication of one of said groups conveying means and therefore of one of said fluid streams, respectively, and means surrounding each of said drums and provided with a window through which only one of said faces thereof can be seen.

References Cited in the file of this patent

UNITED STATES PATENTS

| | | |
|---|---|---|
| 2,504,931 | Knudsen | Apr. 18, 1950 |
| 2,657,376 | McAdam | Oct. 27, 1953 |
| 2,736,192 | Ryerson et al. | Feb. 28, 1956 |
| 2,815,500 | Hance et al. | Dec. 3, 1957 |

OTHER REFERENCES

Article, "Multi-Pressure Scanner," by Robert J. Marmorstone in Instruments & Automation, August 1957, vol. 30, pp. 1498–1500. (Photostat in 346–34.)